Jan. 3, 1928.

J. SAUTER ET AL 1,655,197

PROCESS FOR DIMINISHING THE RESISTANCE OF CURRENTS IN CONDUIT PIPES

Filed May 17, 1927

Joseph Sauter
Fronz Levy
INVENTORS

By Otto Munk
their ATTY.

Patented Jan. 3, 1928.

1,655,197

UNITED STATES PATENT OFFICE.

JOSEF SAUTER AND FRANZ LEVY, OF MUNICH, GERMANY.

PROCESS FOR DIMINISHING THE RESISTANCE OF CURRENTS IN CONDUIT PIPES.

Application filed May 17, 1927, Serial No. 192,158, and in Germany June 4, 1925.

With the transmission of liquid, vaporous or gaseous bodies or mixtures of the same through conduit pipes, resistance from currents will appear which resistance results in losses of pressure, of speed and of energy. These losses are particularly great with changes of the cross section of the conduit, so that for instance the transformation of the kinetic energy contained in a current of a liquid or of a gas into potential energy, effected through a gradual increase of the cross section of the conduit, will but incompletely take place. A diminution of these losses will be attained through use of the present invention by giving a motion to a part of the sides or to the whole sides of the conduit pipes which are constructed with a constant or a variable cross section. The direction of the motion contains a permanent or a periodically appearing component, that deviates from the direction of the imagined axis of the conduit pipes, such direction being taken in the direction of the current.

By way of example, a piece of a circularly cylindric pipe might be considered through the inside of which air flows, the pipe having been put in rotation about its longitudinal axis. Now, as a consequence of this rotation the resistance that the air meets with, when running through the revolving part of the pipe is diminished.

In place of the rotation of the pipe with a constant or a variable angular velocity, an oscillatory motion about its longitudinal axis may be given to the pipe, so that in this case the angular velocity will change periodically.

Instead of a piece of the cylindric pipe, as taken in the above mentioned example, there may, in a similar way, be set in motion a conduit of pipes with a cross section tapering, increasing or decreasing in the direction of the current.

Figure 1:
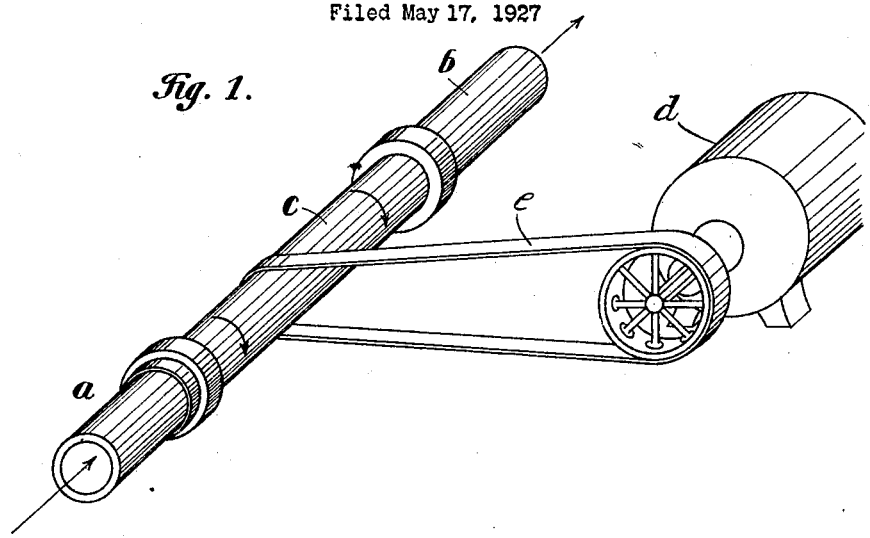
Figure 2:
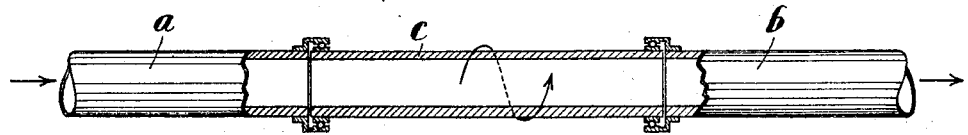
Figure 3:
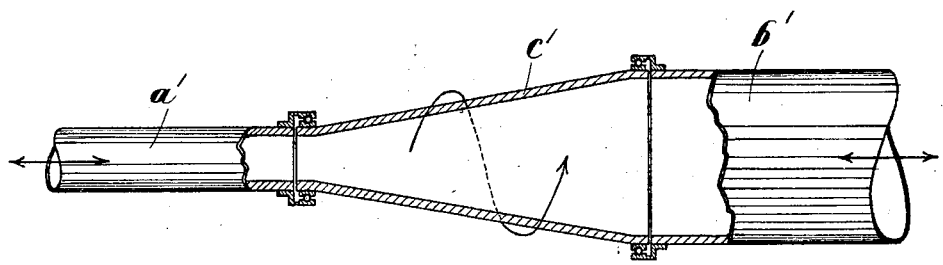

The present invention is illustratively exemplified in the accompanying drawings, in which Figure 1 is a perspective view of a conduit and means for rotating the same; Figure 2 is a substantially longitudinal sectional view of the rotating portion of the conduit; and Figure 3 is a substantially longitudinal sectional view of a tapered rotating portion of a conduit.

Referring to the drawing, $a$ and $b$ denote the stationary tubes of the conduit and $c$ the intermediate rotary section which is supported at its ends on the stationary tubes $a$ and $b$ by means of ball bearings or other suitable devices. Rotary motion is imparted to the section $c$ of the conduit by means of a motor $d$ and belt $e$, but it will be understood that any suitable power means may be employed.

The tapered rotary section $c'$ described above is illustrated in Figure 3, the stationary section $a'$ being the smaller conduit and the stationary section $b'$ being the larger one.

Having now particularly described the nature of this invention and in what manner the same is to be performed, we declare that what we claim is:

1. The herein described method of reducing resistance of flowing liquids through conduit pipes, which consists in imparting a rotary motion to a section of the said pipe.

2. The herein described method of reducing resistance of flowing liquids through conduit pipes, which consists in conducting the liquid through a tapered section of pipe and imparting rotary motion to said tapered section.

In testimony whereof we hereunto affix our signatures.

Dr. JOSEF SAUTER.
FRANZ LEVY.